US007945284B1

(12) United States Patent
Cao et al.

(10) Patent No.: US 7,945,284 B1
(45) Date of Patent: *May 17, 2011

(54) CORDLESS TELEPHONE WITH MP3 PLAYER CAPABILITY

(75) Inventors: Qinghong Cao, Allentown, PA (US); Liang Jin, Allentown, PA (US); Wenzhe Luo, Allentown, PA (US); Jian Wu, Macungie, PA (US); Zhigang Ma, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/447,284

(22) Filed: Nov. 23, 1999

(51) Int. Cl.
 *H04M 1/00* (2006.01)
(52) U.S. Cl. ............... 455/556.1; 455/3.06; 455/426.1; 455/567
(58) Field of Classification Search ............... 455/3.06, 455/3.05, 426, 456, 452, 556, 557, 556.1, 455/426.1, 456.1, 452.1, 566.1, 566, 567
 See application file for complete search history.

(56) References Cited

U.S. PATENT DOCUMENTS

| 4,481,382 | A | * | 11/1984 | Villa-Real ................. 455/556.1 |
| 4,591,661 | A | * | 5/1986 | Benedetto et al. ......... 455/556.1 |
| 5,515,420 | A | * | 5/1996 | Urasaka et al. ............... 379/354 |
| 5,519,762 | A | * | 5/1996 | Bartlett .......................... 340/7.38 |
| 5,577,190 | A | | 11/1996 | Peters ........................... 395/501 |
| 5,671,267 | A | | 9/1997 | August et al. ................... 379/61 |
| 5,694,467 | A | * | 12/1997 | Young, III ..................... 379/430 |
| 5,802,467 | A | | 9/1998 | Salazar et al. ................. 455/420 |
| 5,870,678 | A | * | 2/1999 | Matsushiro et al. .......... 455/462 |
| 5,947,746 | A | | 9/1999 | Tsai |
| 5,969,283 | A | | 10/1999 | Looney et al. |
| 5,978,689 | A | * | 11/1999 | Tuoriniemi et al. ........ 455/569.1 |
| 6,006,115 | A | * | 12/1999 | Wingate .................... 379/110.01 |
| 6,029,064 | A | | 2/2000 | Farris et al. ..................... 455/412 |
| 6,035,212 | A | * | 3/2000 | Rostoker et al. .............. 455/351 |
| 6,083,009 | A | * | 7/2000 | Kim et al. ....................... 434/307 |
| 6,167,251 | A | * | 12/2000 | Segal et al. .................... 455/406 |
| 6,172,673 | B1 | * | 1/2001 | Lehtinen et al. .............. 345/716 |
| 6,192,340 | B1 | * | 2/2001 | Abecassis ...................... 704/270 |

(Continued)

FOREIGN PATENT DOCUMENTS

EP     0 804 012     4/1997

(Continued)

OTHER PUBLICATIONS

European Written Opinion and Search Report for EP Application No. 00 310 081.5 dated Jul. 29, 2010.

*Primary Examiner* — Nghi H Ly
(74) *Attorney, Agent, or Firm* — Mendelsohn, Drucker & Associates, P.C.; David L. Cargille; Steve Mendelsohn

(57) ABSTRACT

A cordless telephone which allows a user to play MP3 digital audio bit stream music, using the remote handset of a cordless telephone to control the functions of the MP3 player. The cordless telephone remains usable as a typical cordless telephone with all the features and conveniences of a cordless telephone including, but not limited to, connection of a telephone call between a calling party and a called party, caller ID information, voice messaging features, etc. MP3 digital audio bit stream music may be downloaded from a remote source through, e.g., the Internet and a PC.

19 Claims, 6 Drawing Sheets

U.S. PATENT DOCUMENTS

| | | | |
|---|---|---|---|
| 6,198,941 B1 * | 3/2001 | Aho et al. | 455/426 |
| 6,198,947 B1 | 3/2001 | Barber | |
| 6,253,122 B1 * | 6/2001 | Razavi et al. | 340/438 |
| 6,300,880 B1 * | 10/2001 | Sitnik | 235/375 |
| 6,332,175 B1 * | 12/2001 | Birrell et al. | 711/112 |
| 6,343,217 B1 * | 1/2002 | Borland | 455/462 |
| 6,353,870 B1 * | 3/2002 | Mills et al. | 710/301 |
| 6,377,820 B1 | 4/2002 | Courtis et al. | 455/563 |
| 6,430,530 B1 * | 8/2002 | Ng | 704/229 |
| 6,546,241 B2 * | 4/2003 | Iyengar et al. | 455/412.1 |
| 6,556,965 B1 * | 4/2003 | Borland et al. | 704/200.1 |
| 6,697,944 B1 * | 2/2004 | Jones et al. | 713/168 |
| 6,704,394 B1 | 3/2004 | Kambhatla et al. | 379/67.1 |
| 6,738,620 B2 | 5/2004 | Siemens | 455/426.1 |
| 6,871,048 B2 | 3/2005 | Takagaki | 455/66.1 |
| 6,950,674 B2 | 9/2005 | Jarrett | 455/552.1 |
| 6,952,414 B1 | 10/2005 | Willig | 370/352 |
| 7,123,936 B1 | 10/2006 | Rydbeck et al. | 455/557 |
| 7,702,363 B2 | 4/2010 | Cao et al. | 455/556.1 |
| 2002/0046240 A1 | 4/2002 | Graham et al. | 709/203 |

FOREIGN PATENT DOCUMENTS

| | | |
|---|---|---|
| EP | 0 823 789 | 6/1997 |
| EP | 1 049 312 A2 | 11/2000 |
| EP | 1 104 150 A2 | 5/2001 |
| GB | 2 308 775 A | 7/1997 |
| JP | 6097874 A | 4/1994 |
| JP | 407212829 A * | 8/1995 |
| JP | 8098259 A | 4/1996 |
| JP | 09187060 | 7/1997 |
| JP | 10327223 A | 12/1998 |
| JP | 11-112615 | 4/1999 |
| JP | 11-112615 A | 4/1999 |
| JP | 11288558 | 10/1999 |
| JP | 11313366 | 11/1999 |
| JP | 2001007900 | 1/2001 |
| WO | WO 99/00962 | 1/1999 |
| WO | WO 99/43136 * | 8/1999 |
| WO | WO 00/38340 | 6/2000 |

* cited by examiner

CORDLESS TELEPHONE WITH MP3 PLAYER CAPABILITY

BACKGROUND OF THE INVENTION

1. Field of the Invention

This invention relates generally to cordless telephones. More particularly, it relates to a cordless telephone which has entertainment functionality beyond the conversational capability of conventional cordless telephones.

2. Background of Related Art

Cordless telephones having a remote handset and a base unit are known in the art. Typically, the base unit is powered by conventional AC current from a household electrical outlet, and the remote handset operates using battery power. To recharge the battery in the remote handset, the remote handset is inserted into a cradle in the base unit for recharging using the AC current of the base unit. However, the remote handset may be separated from the base unit for extended periods of time, allowing the user to carry the remote handset with them as they move about their residence or other locale.

Conventional cordless telephones further typically include an earpiece and a microphone to allow a user to participate in a conversation in an established telephone call.

The earlier analog cordless telephones, while still prevalent, are being replaced with newer technology digital cordless telephones. Digital cordless telephones typically use a 900 MHz band and make use of high power digital spread spectrum cordless telephone technology.

In general, a conventional digital cordless telephone includes a processor in each of the remote handset and in the base unit, and matching radio frequency (RF) units in each of the remote handset and base unit, allowing digital wireless communication between the remote handset and its base unit.

Cordless telephones have been conventionally limited to conversational use, e.g., for establishing a telephone call, or for providing intercom communications between a remote handset and its base unit. For other functions outside of telephony (particularly portable functions), a user is required to obtain a separate device, and carry around both. While portable devices are useful, there is a point at which a user must decide between which portable devices to carry around at any one time, resulting in use of either the cordless telephone or the other portable device.

There is a need to expand the uses of a cordless telephone beyond that afforded by conventional cordless telephones.

SUMMARY OF THE INVENTION

In accordance with the principles of the present invention, a cordless telephone comprises a remote handset, and a base unit matched to the remote handset. A digital audio bit stream player is integrated within at least one of the remote handset and the base unit.

A method of integrating a digital bit stream music player in a cordless telephone in accordance with another aspect of the present invention comprises playing pre-loaded MP3 music from a remote handset of a cordless telephone.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
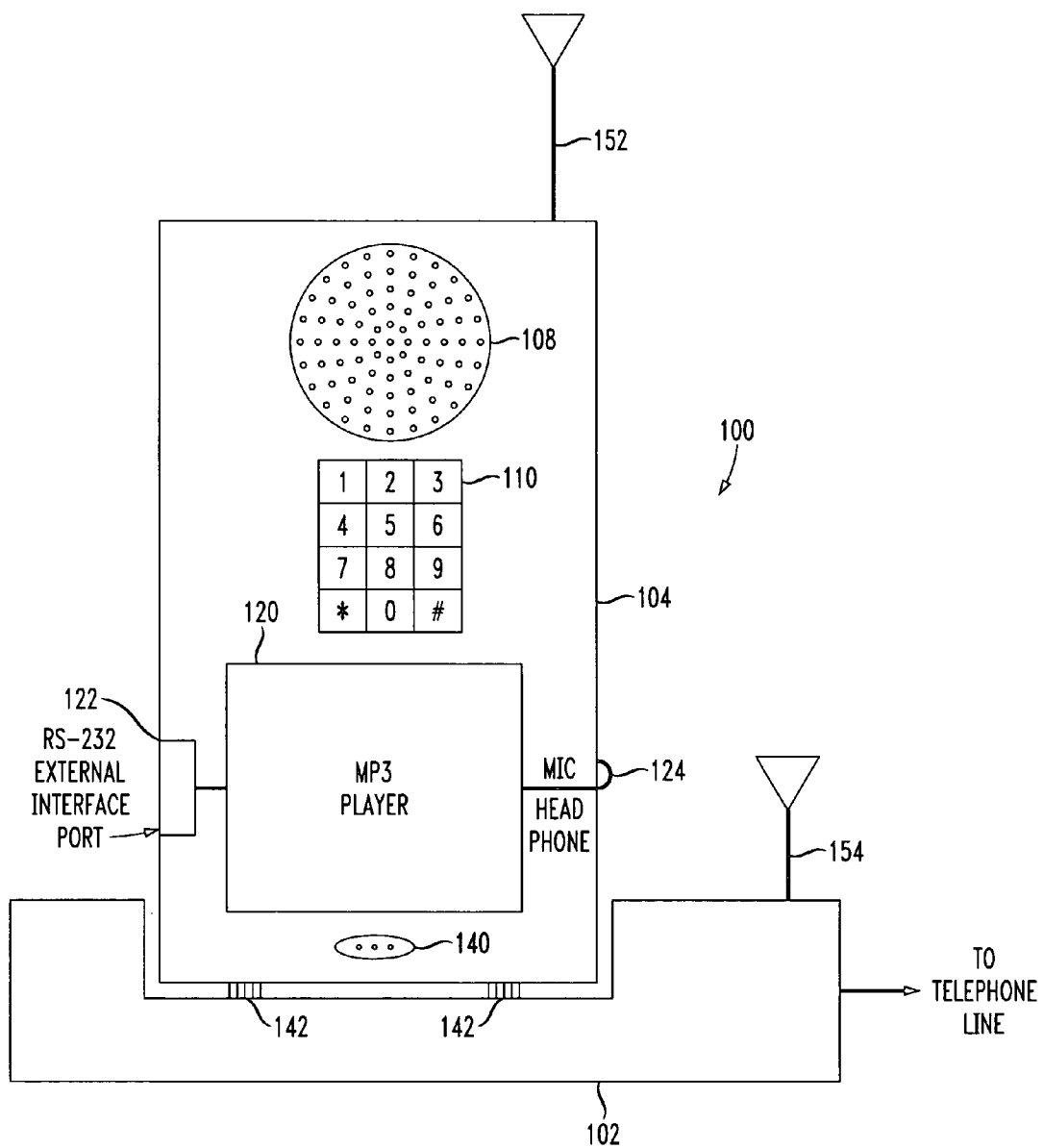
FIG. 1 is a block diagram illustrating an exemplary MP3 cordless telephone which allows a user to play MP3 audio downloaded from an external source as well as otherwise conventional cordless telephone functionality, provided in accordance with the principles of the present invention.

The present invention relates to a cordless telephone which allows a user to download, store, and play a digitized musical audio stream (e.g., MP3 digital audio stream), using either the keypad of the cordless telephone or a separate, dedicated keypad to control the functions of the MP3 player portion of the cordless telephone. The cordless telephone of the present invention remains usable as a typical cordless telephone with all the features and conveniences of a cordless telephone including, but not limited to, connection of a telephone call between a calling party and a called party, caller ID information, voice messaging features, etc.

If a user of a conventional MP3 (MPEG encoded music) player goes walking, jogging or biking in his or her neighborhood, he or she cannot receive phone calls to their house or make phone calls from their home phone unless they are also carrying a remote handset of a cordless telephone. Moreover, even if they are carrying a remote handset, use of an MP3 or other audio bit stream player makes it difficult at best to hear the audible ringing of the cordless telephone. For instance, if the user listens to an MP3 player via a headset, they may have difficulty hearing their telephone ringing.

The present invention provides a new type of portable consumer electronic device, i.e., an MP3 cordless telephone that can be used as a high power cordless telephone and/or as an MP3 player. This allows the user to make and receive telephone calls using a cordless telephone portion of the MP3 cordless telephone, and to listen to audio bit stream music using an audio bit stream (e.g., MP3) player portion of the same MP3 cordless telephone without the risk of missing a telephone call because they did not hear a separate telephone ringing. Moreover, the user may make and receive telephone calls and listen to music whether they are inside their home or office, or in the outside neighborhood surrounding their home or office.

The present invention combines a high power digital spread spectrum cordless telephone together with the functionality of an MP3 player. In particular, in disclosed embodiments, the base unit of a cordless telephone includes the components of an otherwise conventional high power digital spread spectrum cordless telephone, while the cordless (remote) handset includes the otherwise conventional digital spread spectrum cordless telephone components. However, either the base unit and/or remote handset include an integrated MP3 player together with memory and audio circuitry necessary to allow the remote handset to function as a digital MP3 player.

In accordance with the principles of the present invention, the MP3 playing remote handset is adapted to mix the MP3 digital music audio stream together with audio corresponding to ring signals from an incoming telephone call to the base unit. The ring signals are preferably at an audio level at or above that of the MP3 digital music audio stream to notify the music listener when the device receives a ring signal from the base station. The base station is installed in the user's house or office, and is connected to a telephone line from a telephone company central office. Once the listener decides to receive the telephone call, they can activate a "phone on" or similar button to isolate the audio of the telephone call to the user. Preferably, the MP3 digital audio stream is muted with respect to the earpiece of the remote handset. More preferably, the MP3 digital audio stream is paused for the duration of the telephone call, but not necessarily. While the telephone call is activated, the user can use the microphone and earpiece of the remote handset to converse with the caller over the established telephone call.

In accordance with the principles of the present invention, the user can initiate their own telephone calls using similar principles as when receiving a telephone call. For instance, the "phone on" or similar button can be activated to isolate the audio of the telephone line to the microphone and earpiece of the remote handset. The MP3 digital audio stream is preferably muted, and even more preferably paused, for the duration of the use of the telephone.

A digital signal processor (DSP) such as Lucent Technologies 1609 with necessary peripherals and memory added to the existing digital cordless phone handset can be used to provide MP3 decoder/player functionality.

In accordance with the principles of the present invention, the remote handset includes an external data interface port for downloading MP3 music to the audio memory of the remote handset. For instance, an RS-232 serial data port can be used to interface directly with an RS-232 serial data port of a personal computer or other device, e.g., in communication with an MP3 audio source available through the Internet. Compression may be used to transmit the MP3 digital audio data from the computer to the remote handset in an efficient manner.

One technique for downloading music to the remote handset from a source available via the Internet is to include a modem in the base unit of the cordless telephone. The MP3 digital audio data can be downloaded over the Internet during a convenient period of time (e.g., overnight), or upon demand, and stored in memory either in the base unit or in the remote handset. The downloaded MP3 digital audio data can be transmitted to the remote handset via the RF communication channel between the remote handset and the base unit, either in real time or for storage in the remote handset and later playback.

For instance, for real time operations, the MP3 digital audio may be stored in the base unit, and transmitted to the remote handset for playback as desired. Alternatively, the MP3 digital audio may be transferred to memory in the remote handset for playback independent from the base unit.

The present invention enables the user to receive telephone calls while listening to music inside or outside their house. Moreover, it provides functionality of both a telephone and an MP3 player from a common audio device, eliminating the need for separate devices to be purchased by the user. Integration of the MP3 player into a digital cordless telephone also ensures that a user of an MP3 player (particularly one wearing headphones) will be notified of an incoming telephone call while listening to music. Thus, missed telephone calls will be avoided.

FIG. 1 is a block diagram illustrating an exemplary cordless telephone which allows a user to play MP3 audio downloaded from an external source, provided in accordance with the principles of the present invention.

In particular, in FIG. 1, an MP3 cordless telephone 100 includes an MP3 remote handset 104 and a matching base unit 102.

The base unit 102 provides conventional power charging capability to the MP3 remote handset 104 through suitable charge contacts 142 while the MP3 remote handset 104 is cradled in the base unit 102. Moreover, the base unit 102 provides telecommunications between the MP3 remote handset 104 and a telephone line connected to the base unit 102.

The MP3 remote handset 104 includes otherwise conventional cordless telephone components and functionality. For instance, the MP3 remote handset 104 includes a speaker (earpiece) 108 and microphone 140 together with suitable digital-to-analog (D/A) and analog-to-digital (A/D) conversion to allow a user to converse over the telephone line. The MP3 remote handset 104 further includes an antenna 152 and RF transceiver to allow otherwise conventional cordless telephone communications between the MP3 remote handset 104 and the base unit 102. Advanced features such as frequency hopping and channel selection may be employed as known in the art.

Importantly, the MP3 remote handset 104 includes an integrated MP3 player 120. The MP3 player 120 includes an external interface (e.g., an RS-232 interface, a universal serial bus (USB), IEEE-1399 interface, an infrared data association (IRDA) interface, etc.) 122 to allow downloading of audio bit stream data from an appropriate source (e.g., on the Internet via a personal computer (PC)) to appropriate memory in the MP3 player 120. The MP3 player 120 also preferably includes a stereo output to a headphone jack 124, although monaural playback can be performed by summing in the MP3 audio bit stream with received telephone conversation and output using the single speaker 108 of the MP3 remote handset.

The summation of the MP3 audio and telephone conversation may be performed either in digital form (i.e., before conversion to an analog signal for output from the speaker 108 and/or from the headphone jack 124), or in analog form.

Figure 2:
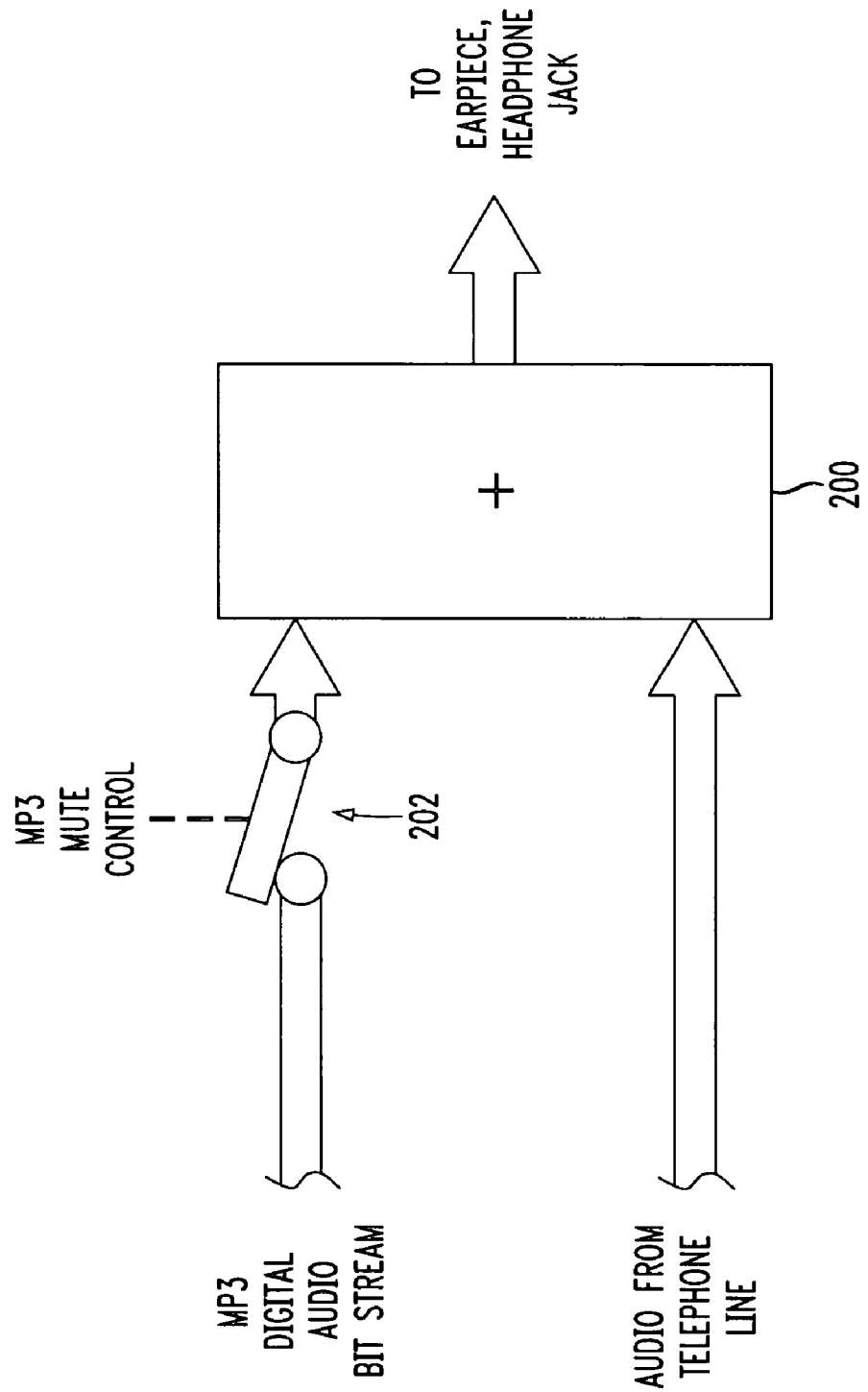
FIG. 2 is a block diagram illustrating the multiplexing of MP3 digital audio with the audio from a telephone conversation, and allowing muting of the MP3 digital audio stream, in accordance with the principles of the present invention.

FIG. 2 is a block diagram illustrating the multiplexing of MP3 digital audio with the audio from a telephone conversation, and allowing muting of the MP3 digital audio stream, in accordance with the principles of the present invention.

In particular, in FIG. 2, the audio from the telephone line is summed with the MP3 digital audio bit stream in an appropriate digital or analog summer 200. For clarity purposes, it is preferred that the MP3 digital audio bit stream and the audio from the telephone line be summed in digital form, before being converted to analog signals. Moreover, summation in the digital domain will greatly improve the muting of the MP3 digital audio bit stream as denoted by a figurative switch 202, particularly when a telephone call is in progress.

The summation of the monaural audio from the telephone line may be summed into each of the stereo channels of the MP3 digital audio bit stream to improve a sense of balance in the listener.

Figure 3:
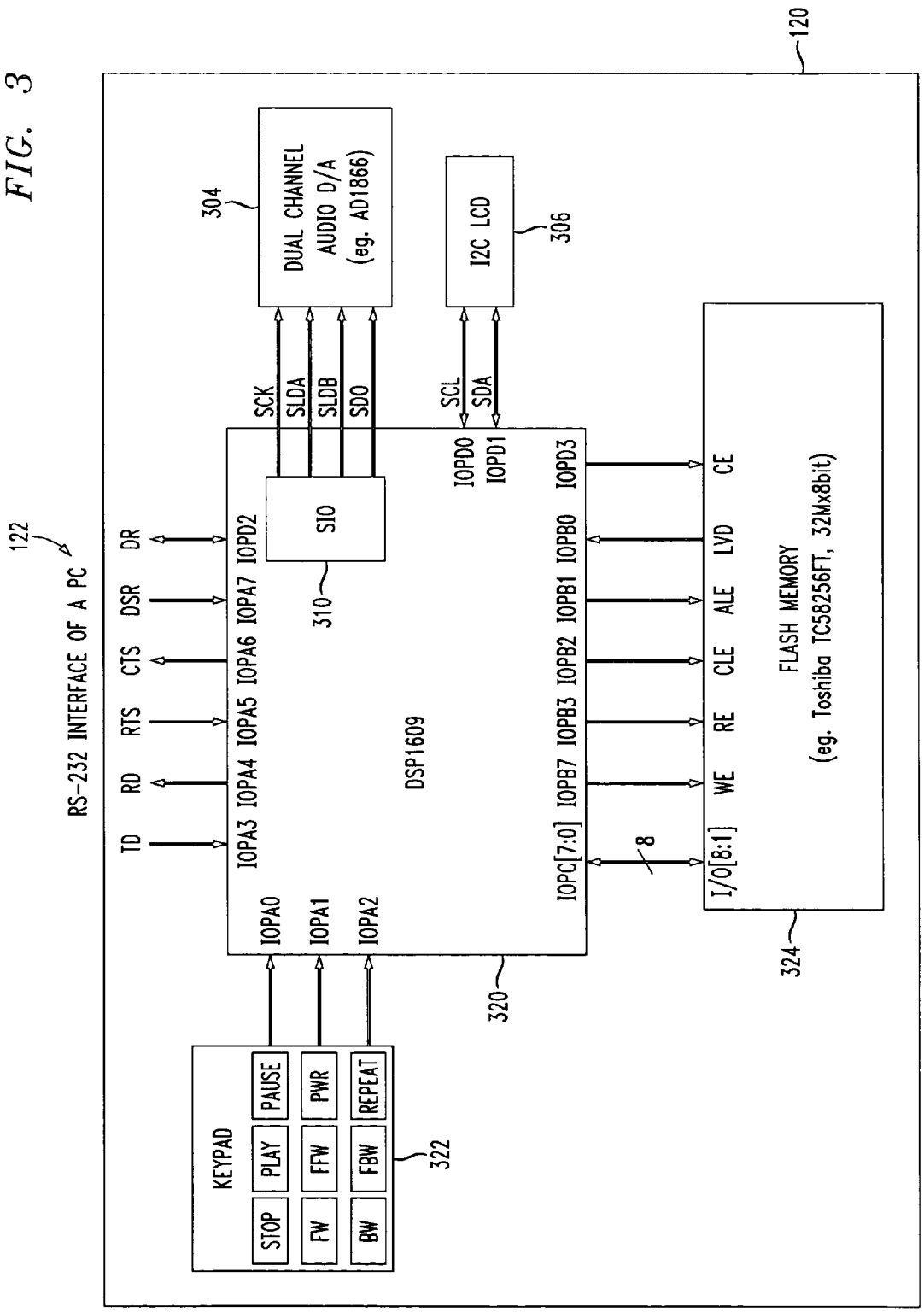
FIG. 3 is a detailed diagram of the MP3 player portion of the MP3 remote handset shown in FIG. 1, in accordance with the principles of the present invention.

FIG. 3 is a detailed diagram relating to the MP3 player portion 120 of the MP3 remote handset 104 shown in FIG. 1, in accordance with the principles of the present invention.

In particular, FIG. 3 shows the implementation of an MP3 player 120 in an MP3 remote handset 104 of a digital cordless telephone 100 using a high performance processor 320, and a sufficient amount of erasable Flash Memory 324 to store downloaded MP3 digital audio bit stream music.

The high performance processor 320 may be any suitable processor, e.g., a microprocessor, a microcontroller, or a digital signal processor (DSP). For instance, the processor used in the disclosed embodiment is a DSP from the LUCENT® DSP1600™ family of processors, and in particular the LUCENT® DSP1609 DSP having approximately 100 MIP performance.

The MP3 player 120 further includes a dedicated keypad 322, although multiplexing of an existing keypad such as the alphanumeric keypad associated with the dial pad of the cordless telephone portion of the MP3 cordless telephone 100 may alternatively be implemented.

The disclosed embodiment of an MP3 remote handset 104 further includes a digital-to-analog converter for each channel of the stereo music. As shown in FIG. 3, a dual channel audio D/A converter 304 (e.g., the commercially available AD1866) is implemented through communication with the DSP 320 using a serial input/output (SIO) communication block 310 in the DSP.

There are many architectures allowing display of information relating to the MP3 player. In the disclosed embodiment, a serial communication link, e.g., an I²C serial communication link, is used to pass data for display from the DSP 320 to a display driver 306.

The disclosed display is a liquid crystal display (LCD). Using an I²C serial communication link from the DSP 320, the display driver 306 is a suitable I²C capable display driver.

As implemented, the DSP1600™ processor (e.g. DSP1609™) can decode in real time a digital MP3 audio bit stream, as well as handling other MP3 player functions such download, display messages on a LCD, supporting audio D/A, key functions such as play, stop, forward, backward, repeat, etc. Using a high performance DSP such as the DSP1600™ family (e.g., DSP1609™), a high performance/low cost solution is provided.

The MP3 player 120 in the MP3 remote handset 104 performs the basic functions found in commercially available stand alone MP3 player devices: (1) Downloading of MP3 digital audio bit stream data; (2) Playing MP3 digital audio bit stream data; (3) Allowing operator keypress control; and (4) Displaying MP3 status information to the user.

(1) Downloading of MP3 Digital Audio Bit Stream Data

IOPA[3:7] and IOPD2 of the Lucent® DSP1609™ are connected to TD, RD, RTS, CTS, DSR, DR of an RS-232 port of a personal computer (PC) to accept a download of MP3 digital audio, e.g., from a source available to the PC over the Internet.

Figure 4:
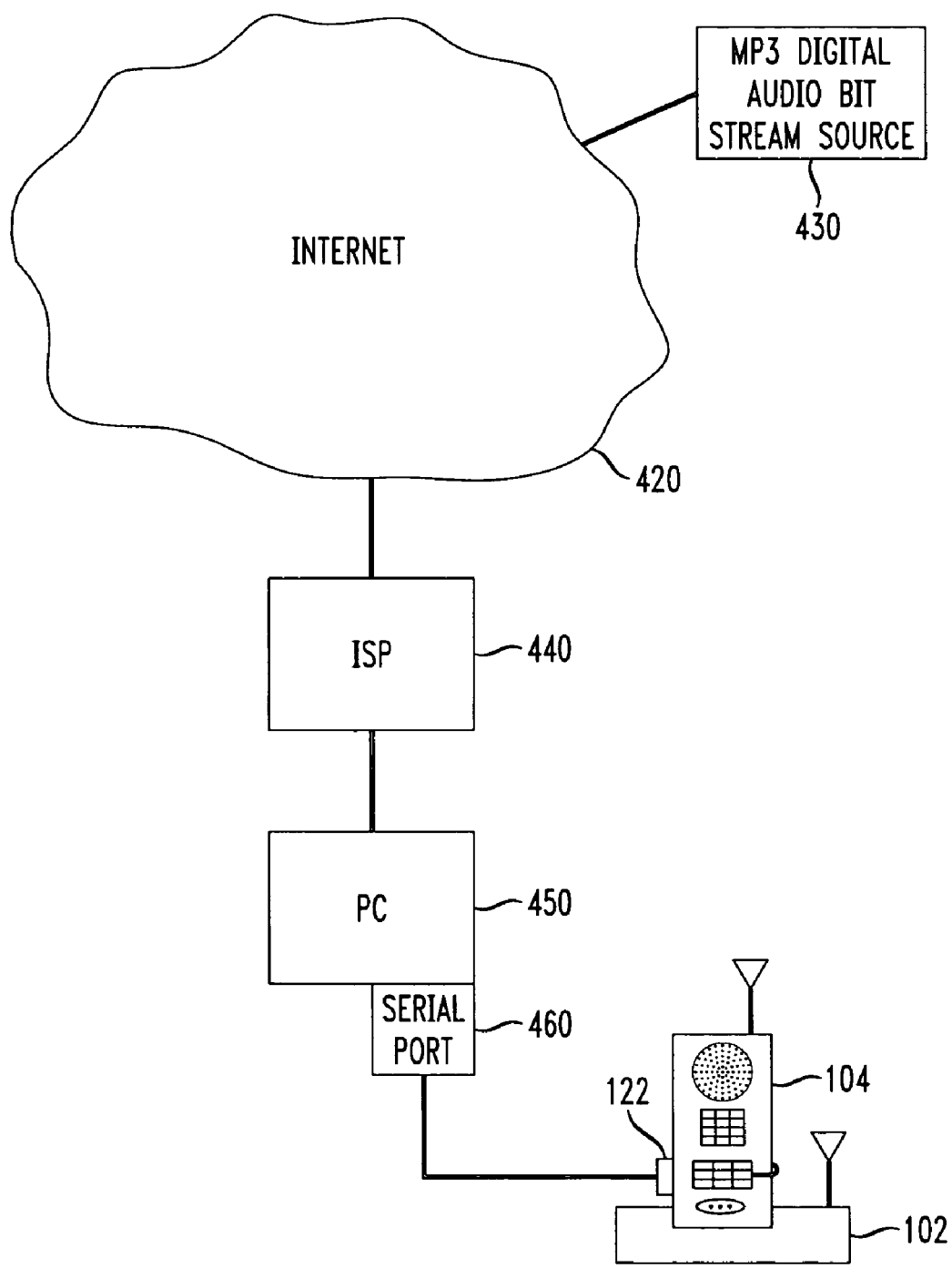
FIG. 4 is a diagram showing an exemplary downloading of MP3 digital audio bit stream music from an MP3 digital audio bit stream source available on the Internet. The MP3 digital audio bit stream music is downloaded to a personal computer (PC) from the Internet source, and transferred to the MP3 cordless telephone using a wired or wireless connection between a serial data port of the PC and the serial data port of the MP3 cordless telephone, in accordance with the principles of the present invention.

FIG. 4 is a diagram showing an exemplary downloading of MP3 digital audio bit stream music from an MP3 digital audio bit stream source 430 available on the Internet 420. The MP3 digital audio bit stream music is downloaded to a personal computer (PC) 450 from the Internet source 430, and transferred to the MP3 remote handset 104 using a wired (shown) or wireless connection between a serial data port 460 of the PC 450 and the serial data port 122 of the MP3 remote handset 104, in accordance with the principles of the present invention.

A suitable data transfer program on the PC 450 and an RS-232 driver operating on the DSP 320 of the MP3 player portion 120 of the MP3 remote handset 104 support the download of an MP3 digital audio bit stream from the Internet source 430, through the PC 450, to the DSP 320 of the MP3 remote handset 104 through an appropriate RS-232 port 122.

The DSP 320 stores the downloaded MP3 digital audio bit stream to suitable mass storage memory, e.g., to a serial flash memory device 324 (e.g. Toshiba TC58256, 32Mx 8-bit in the disclosed embodiment).

A DSP driver adapted to interface the serial flash memory device 324 to the DSP 320 is implemented in the DSP 320. For example, in the DSP1609™ device shown in FIG. 3, pins IOPC[8:1], IOPB7, IOPB [3:0], and IOPD3 are used.

(2) Playing MP3 Digital Audio Bit Stream Data

To play an MP3 digital audio bit stream previously downloaded and stored in the Flash memory 324, the MP3 digital audio bit stream is continuously read from the flash memory 324 to the internal RAM of the DSP 320, then decoded by the DSP core and converted to an analog signal using the dual channel audio D/A 304. A suitable MP3 digital audio bit stream decoding program is implemented to run on the DSP 320. The reconstructed high quality audio signal (16-bit) is transmitted to the serial input/output (SIO) port 310 of the DSP 320, which drives the dual channel (i.e., stereo) digital-to-analog (D/A) converter 304.

In accordance with the principles of the present invention, the audio from the telephone line can be summed within the DSP 320, or can be summed in analog form external to the DSP 320 subsequent to the dual channel audio D/A 304. The audio from the telephone line is digitized by an appropriate digital-to-analog converter (e.g., a codec), and provided to the DSP 320.

(3) Allowing Operator Keypress Control

In the disclosed embodiment shown in FIG. 3 using a separate, dedicated keypad 322, input pins of the DSP 320 are used to decode keypress commands input by the user into the keypad 322. For instance, as shown in FIG. 3, the IOPA[2:0] pins of the DSP1609™ having interrupt capability are used to implement the MP3 player key functions such as PLAY, STOP, PAUSE, FW (forward), BW (backward), F.FW (fast forward), F.BW (fast backward), and REPEAT.

(4) Displaying MP3 Status Information to the User

The display used to display MP3 player functionality may be the same display used for the cordless telephone functionality. Thus, Caller ID may be shown on the same display as the MP3 player status. Of course, separate displays are within the principles of the present invention.

In FIG. 3, the DSP 320 generates and transmits any of a plurality of messages relating to the MP3 player status to the display driver 306 for display to the user. For example, the length of music stored and downloaded to the Flash memory 324 may be shown, the number of songs stored in the Flash memory 324, the elapsed time of each song stored in the Flash memory 324, etc. may be passed to the display driver 306 for display to the user.

In the disclosed embodiment, a serial link between the DSP1609™ and the display driver 306 is used. For instance, an I²C LCD driver is implemented in the DSP 320 using, e.g., the IOPD0 and IOPD1 pins of the DSP1609™. In the disclosed embodiment, the DSP 320 is established as the I²C master. Thus, the DSP 320 includes a master mode I²C driver using the IOPD0 and IOPD1 pins to form a suitable I²C interface. For instance, the serial clock (SCL) and serial data (SDA) signals of the I²C protocol are formed using the IOPD0 and IOPD1 pins of the DSP1609™, respectively, and operated in accordance with the I²C protocol.

Moreover, in accordance with the principles of the present invention, an audible ring may be included in the output audio bit stream music so that a user listening to the MP3 music may hear the telephone ringing along with their music. To this extent, a synthesized tone may be summed with the played MP3 digital audio bit stream music at a level which is preferably distinctly audible to the user. The tone is preferably summed within the DSP 320 in digital form, but may be summed after the dual channel audio D/A 304 in accordance with the principles of the present invention.

Of course, it is within the principles of the present invention to utilize an audible ring from a ringer in an otherwise conventional fashion.

While the disclosed embodiments of the present invention relate to the integration of a player of audio bit stream such as MP3 through the remote handset speaker 108 and/or headphone jack 124, the principles of the present invention relate equally to integration of the MP3 player capabilities primarily in the MP3 remote handset 103, primarily in the base unit 102 of the MP3 cordless telephone 100, or integrated with substantial portions of the MP3 player 120 in both the MP3 remote handset 104 and in the base unit 102.

Figure 5:
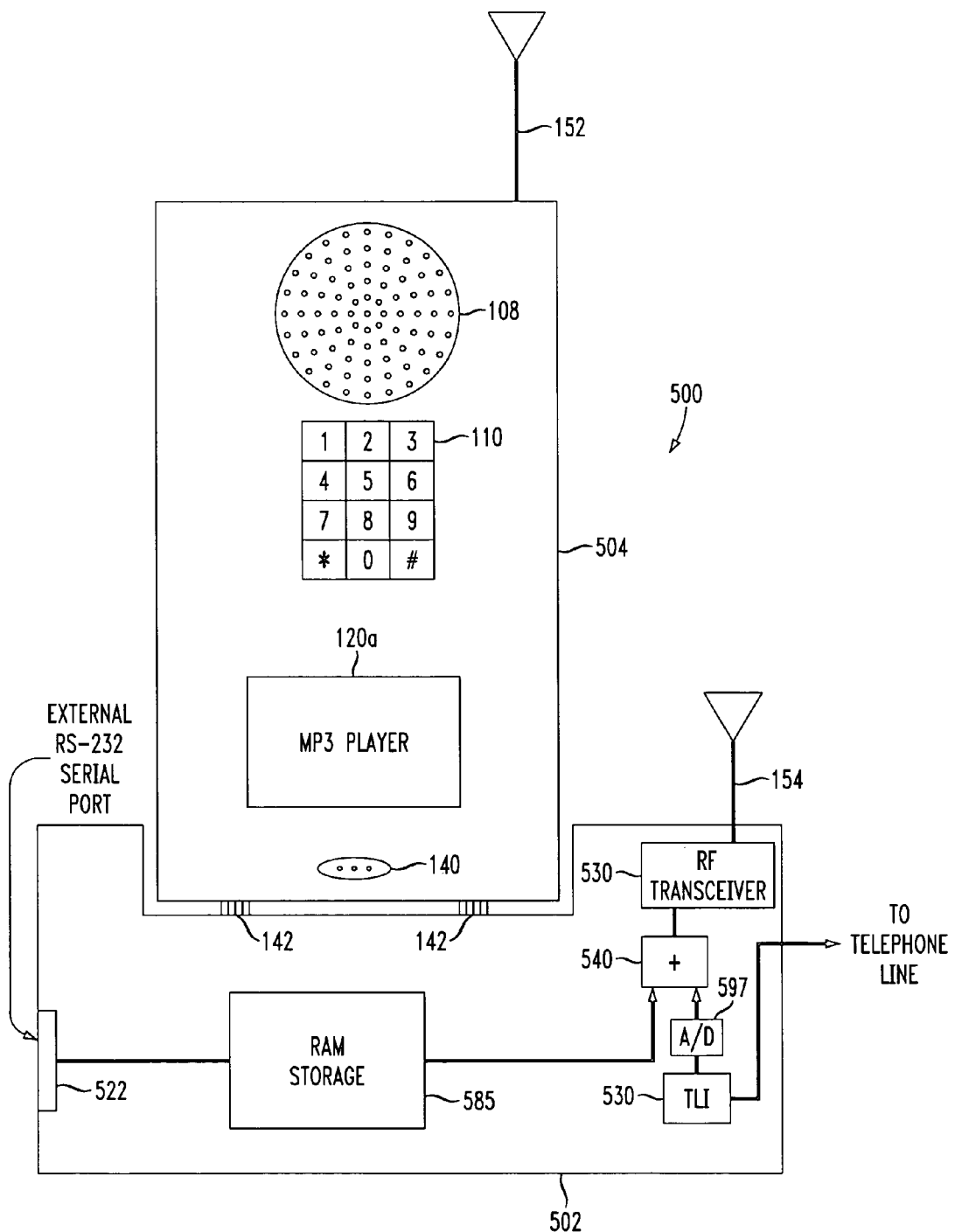
FIG. 5 is a block diagram illustrating another embodiment of a MP3 cordless telephone which allows a user to play MP3 audio downloaded from an external source as well as otherwise conventional cordless telephone functionality, provided in accordance with the principles of the present invention.

For instance, FIG. 5 is a block diagram illustrating another embodiment of a MP3 cordless telephone 500 which allows a user to play MP3 audio downloaded from an external source as well as otherwise conventional cordless telephone functionality, provided in accordance with the principles of the present invention.

In particular, as shown in FIG. 5, the download portion of the MP3 player is implemented within the base unit 502, e.g., an RS-232 serial interface 522 and mass storage (e.g., RAM storage 585) for storing the downloaded digital music. The base unit 102 further includes a digital sample summer 540 to sum at least one (and perhaps both) channels of the stereo MP3 digital audio bit stream with the telephone line audio received by the telephone line interface 530 and digitized by a suitable analog-to-digital (A/D) converter 597. The digital music is decoded and converted to analog in an MP3 player 120a in the remote handset 504.

In the embodiment shown in FIG. 5, the summed digital data is combined and transmitted via the cordless telephone RF transceiver 550 of the base unit 102 to the MP3 remote handset 504.

Preferably, the MP3 remote handset 504 includes MP3 player keypad controls allowing standard operation of an MP3 player, e.g., PLAY, REW, FFWD, etc. The selected MP3 player commands are preferably included in header information transmitted by the MP3 remote handset 504 to the MP3 base unit 502, and received and suitably processed by the DSP of the MP3 player 120a.

Other embodiments are possible within the principles of the present invention locating all or a portion of a digital audio bit stream player either in the base unit, in the remote handset, or distributed between the base unit and the remote handset. For instance, a digital audio bit stream may be received through an interface port in a base unit of a digital cordless telephone as shown in FIG. 5, but instead of being stored in the base unit may be transmitted either in the original data form or in a re-digitized form to the remote handset. The communication between the base unit and the remote handset may be through any suitable technique, e.g., by insertion into the data packets communicated via the RF transceivers of the base unit and remote handset, through the charge contacts 142 with appropriate filtering to separate the transmitted data signal from the charge current, etc. Moreover, once received by the remote handset, the MP3 digital audio bit stream (or re-digitized audio bit stream) may be played either substantially in real-time as received by the remote handset, or stored in appropriate storage (e.g., RAM or Flash memory) in the remote handset and subsequently accessed by the user for later playback.

If the data bit stream contains a large amount of data, it may be loaded into the cordless telephone during periods of non-use of the cordless telephone, e.g., overnight.

Figure 6:
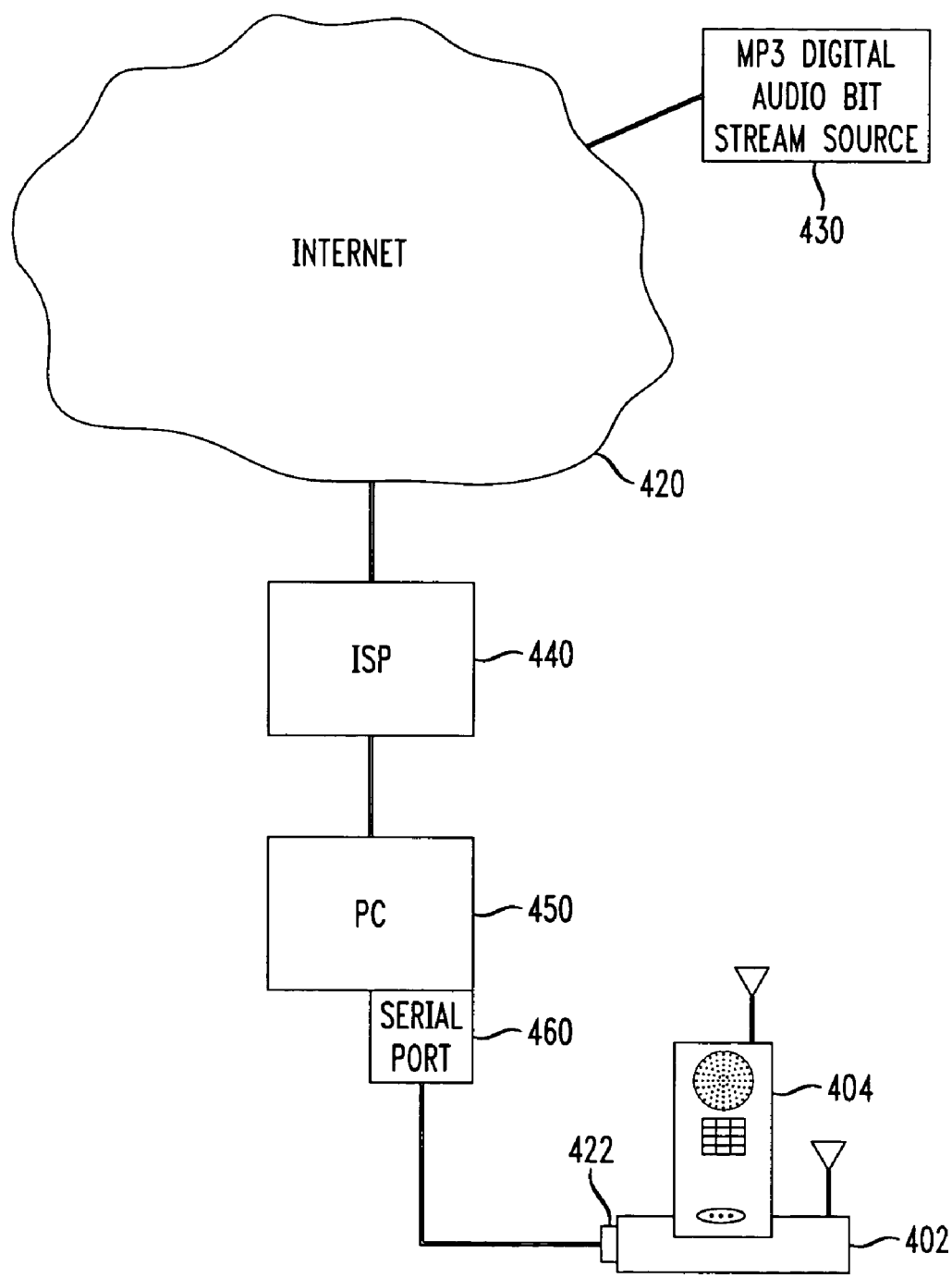
FIG. 6 is a diagram showing an exemplary downloading of MP3 digital audio bit stream music from an MP3 digital audio bit stream source available on the Internet to the MP3 cordless telephone embodiment shown in FIG. 5.

FIG. 6 is a diagram showing an exemplary downloading of MP3 digital audio bit stream music from an MP3 digital audio bit stream source 430 available on the Internet 420 to the MP3 cordless telephone 500 embodiment shown in FIG. 5.

In particular, the MP3 digital audio bit stream is downloaded similar to that shown and described with respect to FIG. 4, but using the RS-232 serial interface port 422 of the MP3 base unit 402 of the MP3 cordless telephone shown in FIG. 5.

Preferably, MP3 digital audio bit stream music can be downloaded to the MP3 remote handset 104, 504 either while it is cradled in the base unit 102, 502 or when it is remote from the base unit 102, 502. However, lengthy downloads may best be performed while the MP3 remote handset 104, 504 is cradled and thus powered by the base unit 102, 502.

Accordingly, an MP3 cordless telephone in accordance with the principles of the present invention combines MP3 or other format digital bit stream portable music player functionality with conventional cordless telephone functionality to provide a singular device capable of allowing sophisticated entertainment as well as cordless telephone use. Such an MP3 cordless telephone having MP3 player capability allows a user to listen to portable digital music in a low cost and easily accessible product without risk of missing a telephone call.

While the invention has been described with reference to the exemplary embodiments thereof, those skilled in the art will be able to make various modifications to the described embodiments of the invention without departing from the true spirit and scope of the invention.

What is claimed is:

1. A cordless telephone, comprising:
a remote handset; and
a base unit matched to said remote handset, wherein said remote handset comprises:
   a digital audio bit stream player adapted to play a digital audio bit stream comprising music;
   a summer adapted to digitally sum a digitally synthesized ring tone indicating an incoming call to said base unit with the digital audio bit stream to allow a user of said cordless telephone to hear said cordless telephone ringing along with said music; and
   a means for muting the playing of said digital audio bit stream by an action initiated by a user of said cordless telephone when said cordless telephone receives a telephone call.

2. The cordless telephone according to claim 1, wherein:
said digital audio bit stream player is one of an MPEG player and an MP3 player.

3. The cordless telephone according to claim 1, wherein said digital audio bit stream is one of (i) an MPEG stream and (ii) an MP3 stream.

4. The cordless telephone according to claim 1, wherein:
said base unit is adapted (i) to receive from a telephone line a telephone audio signal representing a telephone conversation and (ii) to transmit the telephone audio signal to said remote handset; and said summer is further adapted to digitally sum the telephone audio signal representing the telephone conversation with the digital audio bit stream.

5. The cordless telephone according to claim 4, wherein:
the telephone audio signal is monaural;
the digital audio bit stream has a plurality of stereo channels; and
the summer is adapted to digitally sum the monaural telephone audio signal into each of the plurality of stereo channels of the digital audio bit stream, such that a sense of balance in the user is improved.

6. The cordless telephone according to claim 1, wherein:
both said digital audio bit stream player and said summer are jointly implemented as a single digital signal processor adapted to digitally sum the digitally synthesized ring tone with the digital audio bit stream.

7. The cordless telephone according to claim 6, wherein:
the digital signal processor is adapted to digitally sum the digitally synthesized ring tone with the digital audio bit stream by: (i) decoding the digital audio bit stream to produce a digital reconstructed audio signal, and (ii) digitally summing the digital reconstructed audio signal with the digitally synthesized ring tone to produce a digital summed audio signal.

8. The cordless telephone according to claim 7, wherein the cordless telephone further comprises:
a digital-to-analog converter connected to said digital signal processor to receive the digital summed audio signal and to produce an analog audio signal suitable for outputting to the user.

9. A method of operating a cordless telephone comprising a remote handset and a base unit matched to said remote handset, the method comprising:
the remote handset playing MP3 a digital audio bit stream comprising music;
the remote handset digitally summing a digitally synthesized ring tone indicating an incoming call to said base unit with the digital audio bit stream to allow a user of said cordless telephone to hear said cordless telephone ringing along with said music; and
the remote handset muting said playing of said digital audio bit stream by an action initiated by a user of said cordless telephone when said cordless telephone receives a telephone call.

10. The method according to claim 9, wherein:
said muting pauses said playing of said digital audio bit stream.

11. The method according to claim 9, wherein said digital audio bit stream is one of (i) an MPEG stream and (ii) an MP3 stream.

12. The method according to claim 9, further comprising:
the base unit receiving from a Public Switched Telephone Network (PSTN) a telephone audio signal representing a telephone conversation;
the base unit transmitting the telephone audio signal to the remote handset; and
the remote handset digitally summing the telephone audio signal representing the telephone conversation with the digital audio bit stream.

13. The method according to claim 12, wherein:
the telephone audio signal is monaural; and
the digital audio bit stream has a plurality of stereo channels; and
the step of digitally summing the telephone audio signal with the digital audio bit stream comprises digitally summing the monaural telephone audio signal into each of the plurality of stereo channels of the digital audio bit stream, such that a sense of balance in the user is improved.

14. The method according to claim 12, wherein:
the steps of (i) playing the digital audio bit stream from the remote handset of said cordless telephone and (ii) digitally summing the telephone audio signal with the digital audio bit stream are performed by a single digital signal processor.

15. The method according to claim 14, wherein:
the step of digitally summing the digitally synthesized ring tone with the digital audio bit stream comprises:
the digital signal processor decoding the digital audio bit stream to produce a digital reconstructed audio signal, and
the digital signal processor digitally summing the digital reconstructed audio signal with the digitally synthesized ring tone to produce a digital summed audio signal.

16. The method according to claim 15, further comprising:
digital-to-analog converting the digital summed audio signal to produce an analog audio signal suitable for outputting to the user.

17. A cordless telephone, comprising:
a remote handset; and
a base unit matched to said remote handset, wherein said remote handset comprises:
means for playing a digital audio bit stream comprising music;
means for digitally summing a digitally synthesized ring tone indicating an incoming call to said base unit with a digital audio bit stream to allow a user of said cordless telephone to hear said cordless telephone ringing along with said music; and
means for muting said playing of said digital audio bit stream by an action initiated by a user of said cordless telephone when said cordless telephone receives a telephone call.

18. The cordless telephone according to claim 17, wherein:
said means for muting pauses said playing of said digital audio bit stream.

19. The cordless telephone according to claim 17, wherein said digital audio bit stream is one of (i) an MPEG stream and (ii) an MP3 stream.

* * * * *

UNITED STATES PATENT AND TRADEMARK OFFICE
CERTIFICATE OF CORRECTION

| | | |
|---|---|---|
| PATENT NO. | : 7,945,284 B1 | Page 1 of 1 |
| APPLICATION NO. | : 09/447284 | |
| DATED | : May 17, 2011 | |
| INVENTOR(S) | : Qinghong Cao et al. | |

It is certified that error appears in the above-identified patent and that said Letters Patent is hereby corrected as shown below:

In Column 9, Line 34, delete the word "MP3".

Signed and Sealed this
Nineteenth Day of June, 2012

David J. Kappos
*Director of the United States Patent and Trademark Office*